(12) United States Patent
Monks

(10) Patent No.: US 10,209,361 B2
(45) Date of Patent: Feb. 19, 2019

(54) POSITIONING DEVICE FOR AN OPTICAL TRIANGULATION SENSOR

(71) Applicant: THIRD DIMENSION SOFTWARE LIMITED, Bristol (GB)

(72) Inventor: Tim Monks, Bristol (GB)

(73) Assignee: THIRD DIMENSION SOFTWARE LIMITED, Bristol (GB)

( * ) Notice: Subject to any disclaimer, the term of this patent is extended or adjusted under 35 U.S.C. 154(b) by 199 days.

(21) Appl. No.: 15/114,205

(22) PCT Filed: Jan. 19, 2015

(86) PCT No.: PCT/GB2015/050108
§ 371 (c)(1),
(2) Date: Jul. 26, 2016

(87) PCT Pub. No.: WO2015/114309
PCT Pub. Date: Aug. 6, 2015

(65) Prior Publication Data
US 2017/0003393 A1    Jan. 5, 2017

(30) Foreign Application Priority Data

Jan. 28, 2014 (GB) .................................. 1401437.7

(51) Int. Cl.
*G01C 3/08* (2006.01)
*G01S 17/48* (2006.01)
(Continued)

(52) U.S. Cl.
CPC ............ *G01S 17/48* (2013.01); *F01D 21/003* (2013.01); *G01B 11/14* (2013.01); *G01B 11/26* (2013.01);
(Continued)

(58) Field of Classification Search
CPC ..... F01D 21/003; G01B 11/26; G01B 11/306; G01B 11/14; G01S 17/48; F05D 2270/804
(Continued)

(56) References Cited

U.S. PATENT DOCUMENTS 4,326,804 A    4/1982 Mossey
4,541,721 A    9/1985 Dewar
(Continued)

FOREIGN PATENT DOCUMENTS

DE    29616604 U    12/1996
GB    2460248    11/2009
(Continued)

OTHER PUBLICATIONS

International Search Report and Written Opinion, dated Apr. 17, 2015, issued in corresponding International Application No. PCT/GB2015/050108.
(Continued)

*Primary Examiner* — Mark Hellner
(74) *Attorney, Agent, or Firm* — Troutman Sanders LLP

(57) ABSTRACT

A tool or attachment jig for mounting an optical triangulation sensor on a turbine blade in a position to measure the gap between the distal tip of the turbine blade and the adjacent shroud. The tool includes a device for indicating the orientation of the sensor. This means that the tool can match a measurement from the optical triangulation sensor with a position on the circumference of the shroud. By taking a plurality of measurements as the turbine blade is rotated with respect to the annular casing, an angular profile for the gap between the turbine blade and the casing can be obtained in a much quicker and more efficient way than a conventional system.

15 Claims, 3 Drawing Sheets

(51) Int. Cl.
*F01D 21/00* (2006.01)
*G01B 11/26* (2006.01)
*G01B 11/30* (2006.01)
*G01B 11/14* (2006.01)

(52) U.S. Cl.
CPC ...... *G01B 11/306* (2013.01); *F05D 2270/804* (2013.01)

(58) Field of Classification Search
USPC ........................................................ 356/3.01
See application file for complete search history.

(56) References Cited

U.S. PATENT DOCUMENTS

| | | |
|---|---|---|
| 5,017,796 A | 5/1991 | Makita |
| 7,889,119 B2 | 2/2011 | Evers et al. |
| 9,068,906 B2* | 6/2015 | Silieti .................. G01M 15/02 |
| 9,581,440 B2* | 2/2017 | Ruhge .................. G01B 21/16 |
| 2010/0195116 A1* | 8/2010 | Monks .................. G01B 11/25 |
| | | 356/604 |

FOREIGN PATENT DOCUMENTS

| | | |
|---|---|---|
| GB | 2462829 A | 2/2010 |
| JP | 61-161407 | 7/1986 |
| JP | 61161406 A | 7/1986 |
| WO | 2005073667 A1 | 8/2005 |
| WO | 2011/055147 | 5/2011 |
| WO | 2012/091821 | 7/2012 |

OTHER PUBLICATIONS

UK Search Report issued by IPO dated May 28, 2014 in connection with Application No. GB1401437.7.

* cited by examiner

POSITIONING DEVICE FOR AN OPTICAL TRIANGULATION SENSOR

CROSS-REFERENCE TO RELATED APPLICATIONS

This Application is a National Stage of International Application PCT/GB2015/050108, filed Jan. 19, 2015, which claims priority to United Kingdom application 1401437.7 filed Jan. 28, 2014. All applications above are herein incorporated by reference.

FIELD OF THE INVENTION

The invention relates to measurement apparatus which uses triangulation principles to measure the physical geometry of articles and/or their relative position to each other. For example, the invention may be used with a laser triangulation sensor. In particular, the present invention concerns positioning the planar light beam of an optical triangulation sensor with respect to an object to track the object's separation from a reference surface as the object moves relative to the reference surface.

BACKGROUND TO THE INVENTION

Optical measurement systems which use a laser triangulation sensor to obtain dimensional information about objects are known. For example, such systems may be arranged to determine the distance of objects from the sensor or the profile of objects within the field of view of the sensor.

Referring to FIG. 1, a conventional laser triangulation measurement device 1 comprises a light source 2 e.g. laser which is arranged to project a planar beam 4 (e.g. sheet) of light. The planar beam 4 is incident as a line 8 on an object or objects 5, 6 which lie in the field of view 7 of the device 1. Light reflected from the incident line 8 is collected by an imaging device 3, which may be a camera (e.g. having a charge coupled device (CCD) or an active pixel sensor (CMOS) device).

The images captured by the imaging device 3 are processed to determine a data representation of the physical geometry of the objects 5, 6. The processing may involved reference to a calibrated look up table or the like. Such processing is known.

FIG. 2 depicts two dimensions that may be determined using the data representation. The separation (gap G) or planar misalignment (mismatch or flush F) between adjacent surfaces may be determined, e.g. by performing suitable mathematical operations (e.g. line/radius fitting).

An example of a conventional optical triangulation sensor is the GapGun, manufactured by Third Dimension Software Limited.

It is known to use an optical triangulation sensor to measure the size of the spacing, i.e. gap, between the end of a turbine blade and the inner surface of the annular outer casing in which the turbine blade is rotatably mounted. Conventionally this is done with a wedge-shaped standoff that is jammed in between the blade and the surface of the casing to provide a reference surface for the sensor measurements. These measurements have to be performed for various blades around different positions on the casing. This limits the speed at which the measurements can be taken.

Other techniques for obtaining the similar information are also known. For example, U.S. Pat. No. 4,326,804 discloses a system for optically measuring the clearance between a rotating blade member and a relative stationary part. In this system, a probe that is fixed relative to the stationary part emits light towards the rotating blade. The light scattered back from the blade is measured in order to calculate the clearance.

U.S. Pat. No. 7,889,119 discloses a radial gap measurement technique for turbines in which a radar sensor is mounted in the wall of a turbine housing to transmit and receive a microwave signal. The radial gap can be calculated from an evaluation of a Doppler effect exhibited in the measured reflected microwave signals.

SUMMARY OF THE INVENTION

At its most general, the present invention provides a tool or attachment jig for mounting an optical triangulation sensor on a turbine blade in a position to measure the gap between the distal tip of the turbine blade and the inner surface of the annular outer casing (also known as a shroud) in which the blade is rotatably located. Advantageously, the tool includes a device (e.g. a suitably configured accelerometer or gyroscope) for indicating the orientation of the sensor with respect to the direction in which gravity acts (i.e. the vertical). This means that the tool can match a measurement from the optical triangulation sensor with a position on the circumference of the annular casing (e.g. defined as an angle). By taking a plurality of measurements as the turbine blade is rotated with respect to the annular casing, an angular profile for the gap between the turbine blade and the casing can be obtained in a much quicker and more efficient way than the conventional system.

According to a first aspect of the invention, there is provided a positioning device for locating a planar light beam emitted by an optical triangulation sensor across the radial gap between a distal edge of a turbine blade and the inner surface of an annular casing in which the turbine blade is rotatably mounted, the positioning device comprising: an attachment device for mounting on the turbine blade; a frame for supporting an optical triangulation sensor is a fixed position relative to the attachment device; and an orientation sensing device arranged to detect its orientation with respect to the direction in which gravity acts. In use, an optical triangulation sensor is mounted on the frame, which in turn is mounted on the turbine blade. As the turbine blade is rotated within the casing, the optical triangulation sensor may be controlled to take a sequence of measurements, e.g. snapshots of the radial gap. The orientation sensing device may be arranged to detect an orientation corresponding to each radial gap measurement. As a result, the radial gap around the inner surface of the casing can be expressed as a function of the angle that the turbine blade has rotated around the casing.

The frame may be integrally formed with the attachment device. The frame may include one or more engagement arms for orientating the optical triangulation sensor in a manner to enable a measurement of the radial gap between the distal edge of the turbine blade and the inner surface of the annular casing to be taken. In practice, this may mean holding the optical triangulation sensor at an angle relative to the turbine blade so that the planar beam of light from the optical triangulation is emitted towards the distal edge of the turbine blade, so that the planar beam of light intersects the turbine blade and the inner surface of the annular casing in a line that spans a radial gap between the distal edge of the turbine blade and the inner surface of the annular casing.

It is advantageous to be able to quickly and repeatably mount the optical triangulation sensor in the same radial position on a turbine blade, so that a single calibration procedure for the optical triangulation sensor can enable the radial gap measurements taken for a plurality of turbine blades are readily comparable. The attachment device may have a shaped retention profile adapted to mate with the turbine blade at a fixed radial position thereon. Thus, the attachment device may make use of a specific cross-section shape on the turbine blade to achieve the mounting at a fixed radial position. The attachment device may comprise a band which loops around the turbine blade. The band may be a rigid part, e.g. manufactured (e.g. machined or built by a 3D printer) from a suitable plastic. Alternatively the band may be a band capable of gripping the blade, e.g. by applying a compressive force. In this scenario, the band may be a resilient loop (e.g. elastic band) or a fabric band with suitable retentive fastenings, e.g. cooperating hook and loop patches. To prevent slipping, the band may be provided with a non-slip contact layer, e.g. made of rubber or another suitable material with a relatively high friction coefficient.

The device may include a controller connectable to operably communicate with the optical triangulation sensor and the orientation sensing device. The controller may be arranged to output an image capture trigger signal to cause the optical triangulation sensor to capture an image of the line projecting by the planar light beam which spans a radial gap between the distal edge of the turbine blade and the inner surface of the annular casing. The captured image may be stored, e.g. in memory associated with the controller, or transmitted from the device to an external, e.g. remote, computer for subsequent processing. The controller may also be arranged to output an orientation detect trigger signal to cause the orientation sensing device to detect its orientation. The orientation detect trigger signal is preferably output at a time to ensure that the detected orientation corresponds with, e.g. is detected at the same time as, the captured image. The image capture trigger signal and orientation detect trigger signal may be output simultaneously. They may be a single common trigger signal.

The controller may be arranged to output a plurality of image capture trigger signals and orientation detect trigger signals according to a predetermined schedule, e.g. stored on the memory of the controller. The predetermined schedule may provide for a periodic output of image capture trigger signals and orientation detect trigger signals.

The controller may be embodied as a suitably programmed microprocessor or the like.

The positioning device may include a transmitter in wireless communication with a remote computer. Any suitable means of wireless communication may be used, e.g. Bluetooth®, Zigbee®, or 802.11 WiFi. Optical or infrared communications may be used. The transmitter may be arranged to transmit the captured images and detected orientation values to the remote computer. Each captured image may be processed in a conventional manner to yield a measurement for the radial gap. Each radial gap measurement may be associated with the corresponding detected orientation to yield a radial gap profile for the annular casing as a function of angular position of the turbine blade. The remote computer may be arranged to output a graphical display that represents the radial gap profile. Of course, in other embodiments, the captured images and detected orientations may be stored on the device for later processing.

According to a second aspect of the invention, there may be provided a method for measuring the radial gap between a distal edge of a turbine blade and the inner surface of an annular casing in which the turbine blade is rotatably mounted, the method including: mounting an optical triangulation sensor in a fixed radial position on the turbine blade; emitting a planar beam of light from the optical triangulation towards the distal edge of the turbine blade, so that the planar beam of light intersects the turbine blade and the inner surface of the annular casing in a line that spans a radial gap between the distal edge of the turbine blade and the inner surface of the annular casing; rotating the turbine blade relative to the annular casing; capturing a plurality of images of the line that spans the radial gap between the distal edge and the inner surface of the annular casing; and detecting an angular position of the turbine blade within the annular casing for each of the plurality of images. The optical triangulation sensor may be mounted on the turbine blade using the positioning device according to the first aspect of the invention described above. Each captured images can be processed in a known manner to yield a measurement for the radial gap. By linking the measurement for the radial gap with the detected angular position of the turbine blade, useful data concerning the relationship between the distal end of the turbine blade and the whole inner circumference of the annular casing can be obtained quickly and efficiently.

The method may include outputting data representative of the radial gap between the turbine blade around the inner surface of the annular casing as a function of the angular position of the turbine blade within the annular casing.

The method may be repeated for one or more additional turbine blades that are rotatably mounted in the annular casing.

The plurality of images may be captured in a regular manner, e.g. according to a periodic schedule. The optical triangulation sensor may be programmed, e.g. using an suitable software controller, to capture a series of images with identical time interval in between. If the speed of rotation of the turbine blade is known, the angle traversed between images can be calculated from the time interval. This may be used to detect the angular position of the turbine blade, or may be used as a cross check for errors if a separate orientation sensing device is used.

The method may include storing the captured images and data representative of the detected angular position in a manner suitable for downloading or transferred to a computer for subsequent processing. For example, the optical triangulation sensor may have a internal memory or flash drive for this purpose. Alternatively, the method may include transmitting, e.g. in real time, the captured images and data representative of the detected angular position to a remote computer that is arranged to process them to obtain the data representative of the radial gap between the turbine blade around the inner surface of the annular casing as a function of the angular position of the turbine blade within the annular casing. Transmitting may be done wirelessly, e.g. via a Bluetooth® link or the like. If information is transmitted on the fly in this manner, a map of the data can be displayed while the turbine blade is still rotating, which means that potential errors can be detected early, or regions which may require more detailed investigation can be detected promptly.

The optical triangulation sensor may be of the conventional type, e.g. comprising: a light source arranged to emit a planar light beam; and a detector located out of the plane of the planar light beam for detecting light from the planar light beam that is reflected at an angle to the plane of the planar light beam. The light source may include a laser. Any laser used in conventional optical triangulation sensor may be suitable. The laser may be class 3 or lower. For example, it may be a class 2M or 3R. The intensity of the laser may be adjustable (e.g. automatically adjustable) for different optical properties of surfaces to be measured. Alternatively, the light source may comprise one or more LEDs.

The detector may be any suitable imaging device, e.g. a camera incorporating a charge coupled device (CCD) or an active pixel sensor (e.g. CMOS device).

BRIEF DESCRIPTION OF THE DRAWINGS

An embodiment of the invention are described below with reference to the accompanying drawings, in which.

DETAILED DESCRIPTION; FURTHER OPTIONS AND PREFERENCES

Figure 1:
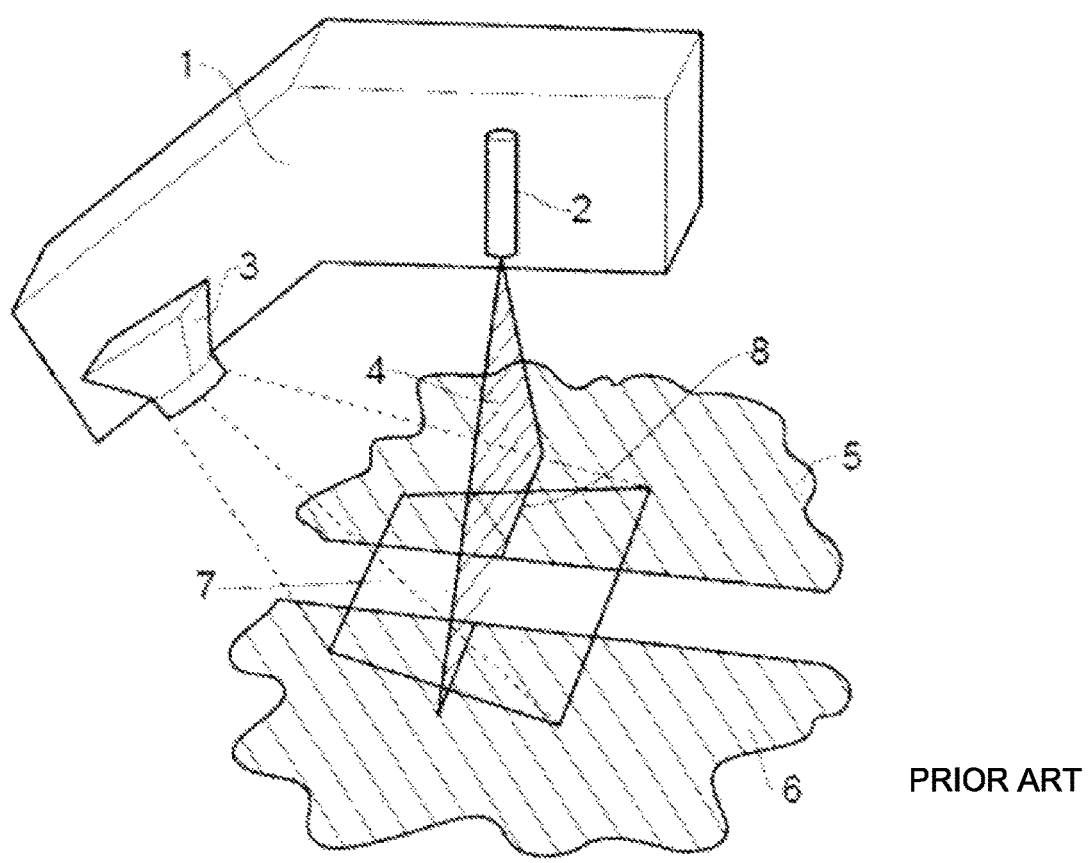
FIG. 1 is a schematic diagram of a conventional laser triangulation sensor and is discussed above.
Figure 2:
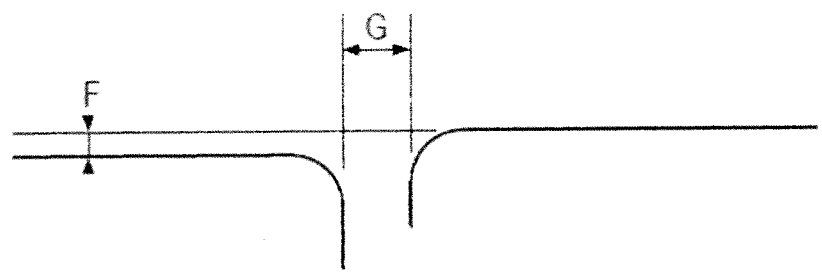
FIG. 2 is a cross-sectional view of a junction between two components illustrated a gap and flush condition and is also discussed above.
Figure 3:
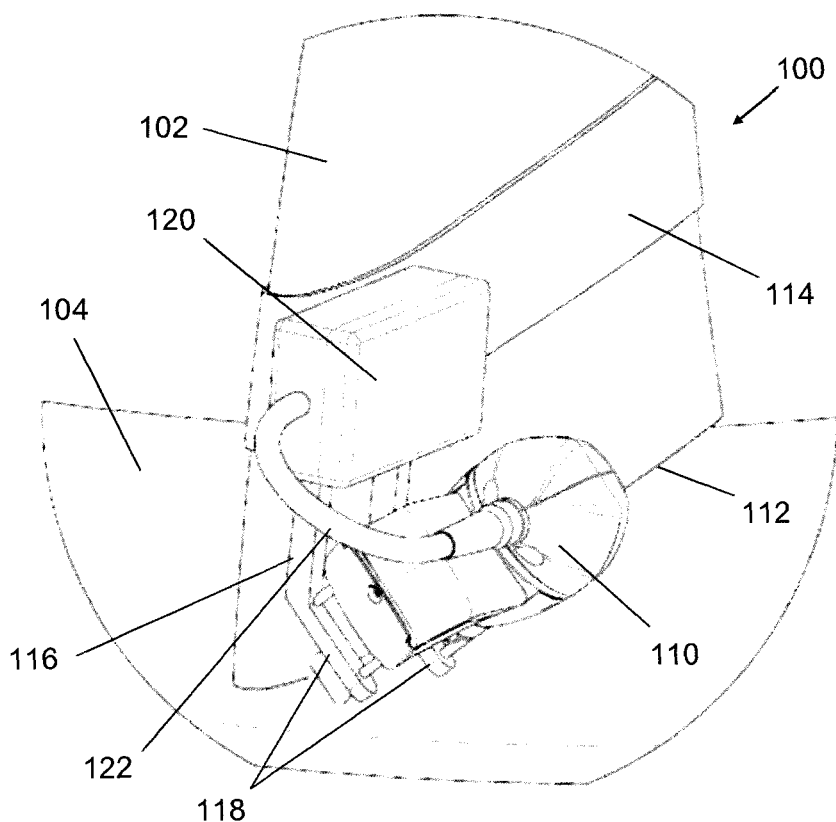
FIG. 3 is a perspective view of a positioning device that is an embodiment of the invention mounted on a turbine blade.
Figure 4:
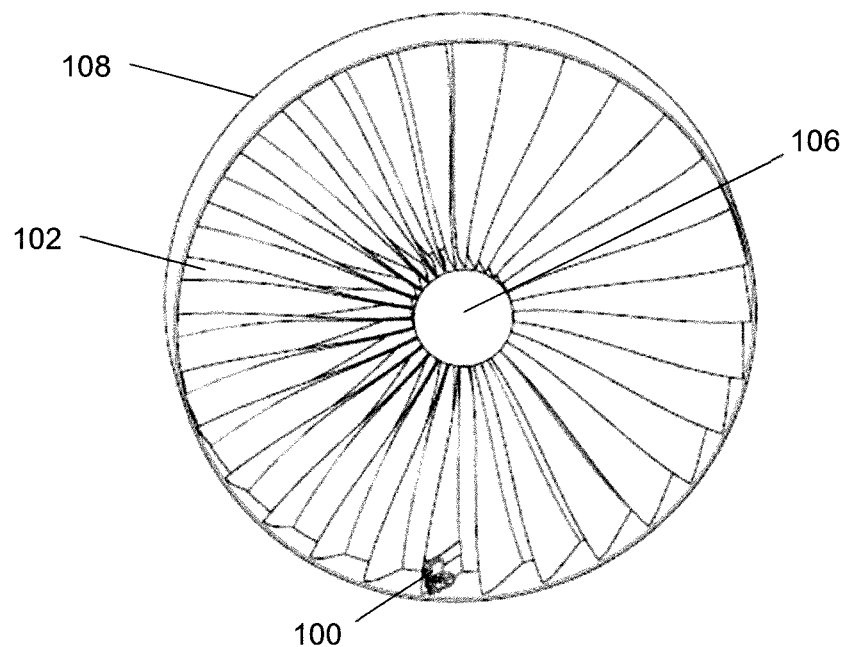
FIG. 4 is a view of a full turbine, which the positioning device of FIG. 3 mounted on one turbine blade.

FIG. 3 is a perspective view of a positioning device 100 that is an embodiment of the invention. The positioning device 100 is mounted on a turbine blade 102, which is arranged to rotate within an annular casing, part of the inner surface 104 of which is shown in FIG. 3. A full front view of the arrangement is shown in FIG. 4, where a plurality of turbine blades 102 are mounted on and rotate with a central shaft 106 relative to the annular casing 108.

The positioning device 100 is mounted towards the distal end of the turbine blade 102, i.e. towards the end closer to the annular casing. As shown in FIG. 3, the purpose of the positioning device is to hold an optical triangulation sensor 110 in manner that permits it to measure the gap between the distal edge 112 of the turbine blade 102 and the inner surface 104 of the annular casing. The gap is an engineered radial spacing that permits rotation of the turbine blade without catching on the annular casing.

In this embodiment, the optical triangulation sensor is a Gap Gun manufactured by Third Dimension Software Limited. It is arranged to emit a planar light beam with intersects with the turbine blade and the inner surface to project a line of light thereon. The line of light exhibits a discontinuity at the radial gap. This discontinuity can be used to measure the size of the gap. The camera and laser (and hence the plane of the laser beam) have a known geometric relationship relative to each other. This allows the position of the laser line in the camera image to be converted to a digital representation of the true shape of the visible parts of the blade and the casing (inner surface). Measurements of the gap can then be extracted either automatically or manually from this information. The optical triangulation sensor includes an image detector (e.g. CCD or suitable camera). The positioning device 100 is arranged to locate the optical triangulation sensor so that the line of light with the discontinuity lies in the field of view of the image detector.

To locate the optical triangulation sensor in the correct position, the positioning device includes an attachment band 114 which fits around the turbine blade 102. The attachment band 114 is shaped to mate with a particular cross-sectional profile of the turbine blade, so that the positioning device can be mounted consistently in a similar position on a plurality of turbine blades. To fine tune the radial position of the sensor, the sensor may output a guide beam that assists an operator to move the sensor further from or closer to the casing.

The attachment band 114 has a frame 116 extending away from it towards the distal end of the turbine blade 102. The frame 116 includes a platform 118 for supporting the optical triangulation sensor 110 at an oblique angle relative to the radial direction. In this embodiment, the platform is a pair of angled finger elements. The frame 116 thus supports the optical triangulation sensor 110 at a position that is radially closer to the distal end of the turbine blade than the attachment band 114. The attachment band 114 therefore does not interfere with the measurements taken by the optical triangulation sensor 110.

In this embodiment, a housing 120 is mounted on the attachment band 114. The housing 120 contains an orientation sensing device (not shown), such as an accelerometer or gyroscope. In one embodiment, the orientation sensing device comprises a six degree of freedom orientation sensor comprising a plurality of accelerometers and magnetic compasses. However, since a turbine always has a horizontal rotation axis, only two of orthogonally accelerometers may be required to give a unique reading for the orientation of the blade. The housing 120 may also contain a controller, e.g. a microprocessor or the like, that is arranged to operate the optical triangulation sensor 110 and orientation sensing device. The optical triangulation sensor 110 may be in communication with the controller via a wired connection 122.

The housing 120 may further contain a data transmitter (not shown) and communication module for communicating an output of the orientation device and the camera of the optical triangulation sensor to a remote computer, which is arranged to analyse and display the data. The data transmitter may be arranged to communicate by any of Ethernet, WiFi, Zigbee® and Bluetooth®.

In use, the positioning device 100 is mounted on the turbine blade 102 and the optical triangulation sensor 110 mounted thereon as shown in FIG. 3. The turbine blade 102 is then rotated, e.g. manually, relative to the inner surface 104 of the annular casing. During rotation, the controller is arranged to instruct the optical triangulation sensor to capture an image and to detect the orientation of the orientation sensing device that corresponds to the captured image. The controller is arranged to perform this process at regular intervals as the turbine blade rotates around the annular casing.

The captured images and associated orientation data can be transmitted wirelessly from the device to a remote computer for processing. Some processing may be done by the controller, e.g. to speed up the transmission process. In some embodiments all processing may be done locally on the device. Where partial processing is done locally, the intermediate data may be any of camera images, point cloud data (i.e. true digital representation of shape) or other partially processed data.

Figure 5:
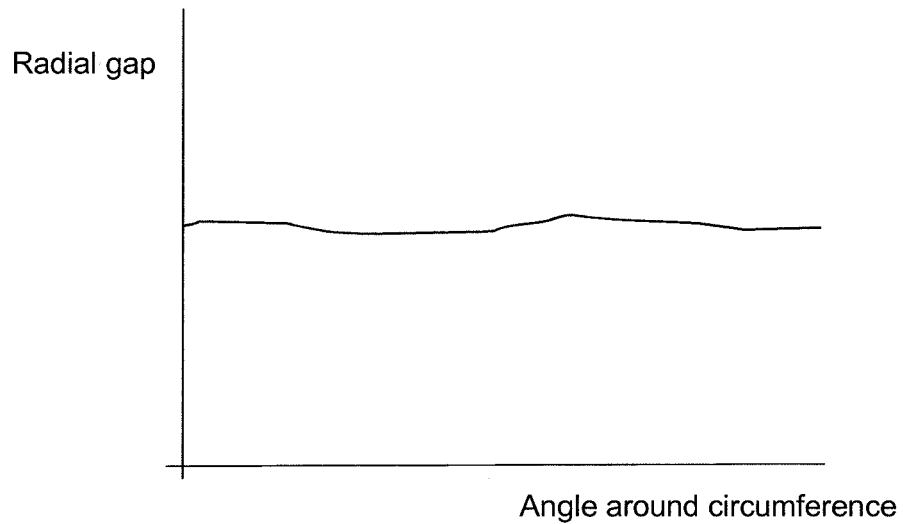
FIG. 5 is a schematic representation of an radial gap profile that may result from the use of the present invention.

The data captured by the optical triangulation sensor can processed to produce a measurement of the radial gap. The data from the orientation sensing device can be interpreted as an angular position around the circumference of the annular casing. By associating each of a plurality of radial gap measurements with an angular position, the data can be processing to yield a radial gap profile as shown in FIG. 5, where the radial gap is plotted as a function of angle around the circumference of the inner surface.

In practice the graph would be used in conjunction with a tolerance band used to determine pass/fail acceptance criteria for the blade clearance. The tolerance band may be represented graphically as a pair of horizontal lines on the graph. The measured data points are required to lie between the horizontal lines in order to meet the tolerance criteria.

Given that the output data records the radial position of the sensor and angle, it may be possible to register all the point cloud data into a world coordinate system. This process may allow both the blade tip position and casing shape to be plotted in a Cartesian coordinate system. Rotating the blade and combining all the data collected during a complete revolution would then give a complete 3D scan of the casing. Subsequent analysis could then look at relative centre points of casing and turbine axis, or identify the position and/or form of specific components on the casing.

The invention claimed is:

1. A positioning device for locating a planar light beam emitted by an optical triangulation sensor across the radial gap between a distal edge of a turbine blade and the inner surface of an annular casing in which the turbine blade is rotatably mounted, the positioning device comprising:
    an attachment device mounting on the turbine blade, the attachment device comprising a frame supporting an optical triangulation sensor in a fixed position relative to the attachment device; and
    an orientation sensing device mounted on the attachment device, the orientation sensing device being arranged to detect an orientation with respect to the direction in which gravity acts, wherein the attachment device includes a shaped retention profile adapted to mate with the turbine blade at a fixed radial position thereon.

2. The positioning device according to claim 1, wherein the frame is integrally formed with the attachment device.

3. The positioning device according to claim 1, wherein the frame includes one or more engagement arms for orientating the optical triangulation sensor in a manner to enable a measurement of the radial gap between the distal edge of the turbine blade and the inner surface of the annular casing to be taken.

4. The positioning device according to claim 1, wherein the attachment device comprises a band which loops around the turbine blade.

5. The positioning device according to claim 1 further comprising a controller connectable to operably communicate with the optical triangulation sensor and the orientation sensing device, wherein the controller is arranged to:
    output an image capture trigger signal to cause the optical triangulation sensor to capture an image of the line projecting by the planar light beam which spans a radial gap between the distal edge of the turbine blade and the inner surface of the annular casing; and
    output an orientation detect trigger signal to cause the orientation sensing device to detect an orientation corresponding to the captured image.

6. The positioning device according to claim 5, wherein the controller is arranged to output the image capture trigger signal and orientation detect trigger signal simultaneously.

7. The positioning device according to claim 5 comprising a memory storing the captured image.

8. The positioning device according to claim 5, wherein the controller is arranged to output a plurality of image capture trigger signals and orientation detect trigger signals according to a predetermined schedule.

9. The positioning device according to claim 1 comprising a transmitter connectable in wireless communication with a remote computer.

10. A method for measuring the radial gap between a distal edge of a turbine blade and the inner surface of an annular casing in which the turbine blade is rotatably mounted, the method comprising:
    mounting an optical triangulation sensor in a fixed radial position on the turbine blade, wherein the optical triangulation sensor is mounted on the turbine blade using a positioning device that comprises:
    an attachment device mounted on the turbine blade, the attachment device comprising a frame that supports the optical triangulation sensor in a fixed position relative to the attachment device, wherein the attachment device includes a shaped retention profile adapted to mate with the turbine blade at a fixed radial position thereon; and
    an orientation sensing device arranged to detect an orientation with respect to the direction in which gravity acts;
    emitting a planar beam of light from the optical triangulation towards the distal edge of the turbine blade, so that the planar beam of light intersects the turbine blade and the inner surface of the annular casing in a line that spans a radial gap between the distal edge of the turbine blade and the inner surface of the annular casing;
    rotating the turbine blade relative to the annular casing;
    capturing a plurality of images of the line that spans the radial gap between the distal edge and the inner surface of the annular casing; and
    detecting an angular position of the turbine blade within the annular casing for each of the plurality of images.

11. The method according to claim 10 comprising outputting data representative of the radial gap between the turbine blade around the inner surface of the annular casing as a function of the angular position of the turbine blade within the annular casing.

12. The method according to claim 10 comprising causing the optical triangulation sensor to capture a series of images with identical time interval in between.

13. The method according to claim 10 comprising storing the captured images and data representative of the detected angular position in a manner suitable for downloading or transferring to a computer for subsequent processing.

14. The method according to claim 10 comprising transmitting the captured images and data representative of the detected angular position to a remote computer that is arranged to process them to obtain the data representative of the radial gap between the turbine blade around the inner surface of the annular casing as a function of the angular position of the turbine blade within the annular casing.

15. The method according to claim 14, wherein transmitting is done wirelessly.

* * * * *